March 25, 1969 J. ZEMANEK, JR 3,434,563
ACOUSTIC WELL LOGGING TOOL
Filed May 29, 1967 Sheet 1 of 2

INVENTOR
JOSEPH ZEMANEK, JR.

ATTORNEY

United States Patent Office 3,434,563
Patented Mar. 25, 1969

3,434,563
ACOUSTIC WELL LOGGING TOOL
Joseph Zemanek, Jr., Dallas, Tex., assignor to Mobil Oil Corporation, a corporation of New York
Filed May 29, 1967, Ser. No. 641,988
Int. Cl. G01v 1/00
U.S. Cl. 181—.5                          6 Claims

ABSTRACT OF THE DISCLOSURE

This specification discloses an acoustic logging tool of the type having spaced transmitting and receiving transducers. The transducers are inclined toward one another and the logging tool includes acoustic attenuating means for reducing acoustic cross-feed between the transducers. The attenuating means comprises a baffle member interposed between the transducers and positioned adjacent one of the transducers.

BACKGROUND OF THE INVENTION

*Field of the invention*

This invention relates to acoustic well logging tools, and more particularly to such tools having two or more transducers inclined toward one another and provided with means for reducing the cross-feed between such transducers without significant attenuation of the survey signals.

*Description of the prior art*

It is a conventional practice to survey a well or the subterranean formation penetrated thereby by acoustic logging techniques in which acoustic signals, normally at frequencies predominantly in the ultrasonic range, are generated and received by a logging tool run through the well. One acoustic logging technique involves the generation and reception of acoustic signals and the determination of the travel time of such signals between the transmitting and receiving transducers. By this technique, the velocity of sound through a given stratum may be determined in order to gain information regarding the lithology of the stratum. Another technique involves the generation and reception of directional acoustic energy, usually in a rotational mode, in order to obtain an indication of the configuration of the well and/or the presence or absence of anomalies in the wall of the well or within the adjacent formations.

One difficulty encountered in acoustic logging is the tendency for cross-feed between the transmitting transducer and the receiving transducer to produce "noise" which masks or distorts the received survey signals. For example, in velocity logging techniques, if the sound transmission through the logging tool is faster than sound transmission through the formations under investigation, the logging instrument may give an erroneous reading. To alleviate the difficulties presented by such cross-feed numerous techniques have been proposed to acoustically isolate the tarnsmitter and receiver from one another.

SUMMARY OF THE INVENTION

In accordance with the present invention, there is provided an acoustic logging tool including a transducer assembly which provides for greatly reduced cross-feed between spaced transmitting and receiving transducers which are inclined toward one another. The acoustic logging tool embodying the present invention comprises a carriage member on which are mounted first and second transducer supports at longitudinally spaced positions thereon. First and second transducers are mounted respectively, on the first and second transducer supports. The first transducer has an outer active face inclined in the direction of the receiving transducer. Thus, the edge of the active face of the first transducer which is remote with respect to the second transducer is spaced laterally outward of the edge of the active face of the first transducer which is proximate with respect to the second transducer. A baffle member formed of an acoustic attenuating material is positioned between the first and second transducers and adjacent the first transducer. The baffle member is at least coextensive with the proximate side of the first transducer and preferably terminates within the lateral interval defined by the remote and proximate edges of the active face of the first transducer. The transducer assembly also is provided with a liner formed of an acoustic attenuating material which is interposed between the inner surface of the first transducer support and the carriage member.

In a preferred embodiment of the invention, the carriage member is mounted on a support structure for rotational movement about an axis extending longitudinally of the logging tool. The afoementioned transducer supports, liner, and baffle member extend around the periphery of the carriage member and the baffle member is supported on the carriage structure and extends laterally outward from the surface thereof and in an abutting relationship with the proximate side of the first transducer. A recess is formed in the inner surface and the proximate end of the first transducer support and extends peripherally around the carriage member. A second liner formed of an acoustic attenuating material is disposed in the recess between the first referred-to liner and the baffle member and also extends peripherally around the carriage member. Preferably, this second liner extends laterally outward from the carriage structure a distance less than the aforementioned recess whereby a void space is provided in the recess.

*Brief description of the drawings*

With reference to FIGURE 1, there is illustrated schematically an acoustic logging system embodying the improved logging tool of the present invention. The system includes an elongated logging tool 10 which is shown as extended from a cable 11 within a well 12. The well 12 is filled with a fluid, such as drilling mud, indicated by reference numeral 14. The logging system also includes remote circuitry 16 at the surface and a suitable readout means such as a cathode ray oscilloscope 18 upon which a facsimile of the wall of the well may be displayed.

Figure 1:
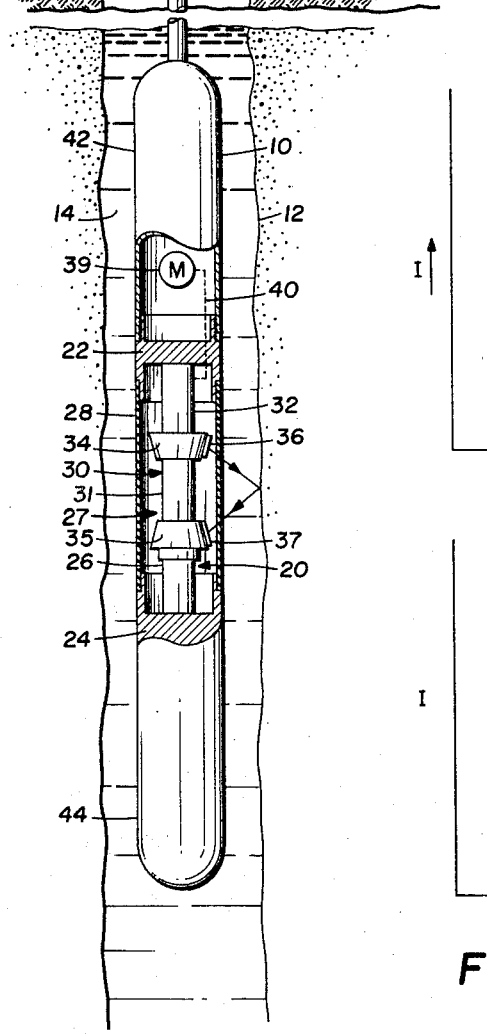
FIGURE 1 is a schematic illustration, partly in section, of an acoustic logging system including a logging tool embodying the invention.
Figure 1:
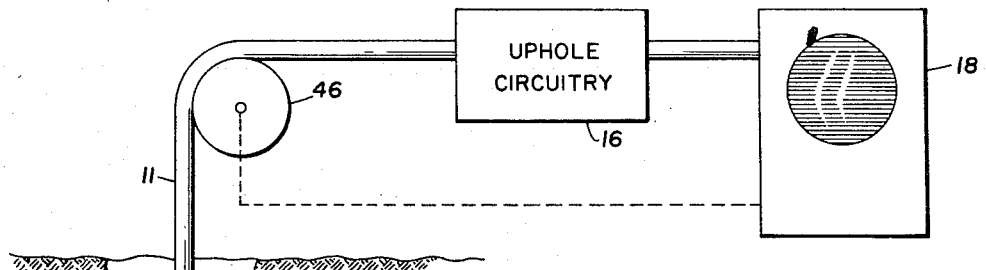
Figure 1:
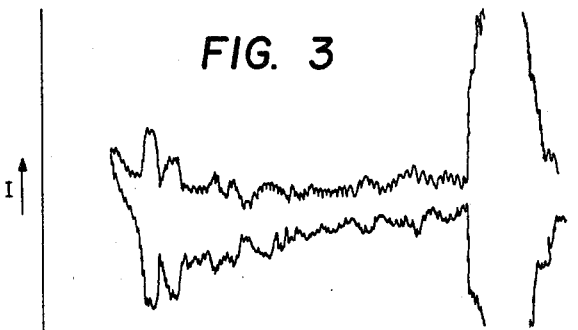

The logging tool 10 is shown with parts broken away in order to illustrate schematically the transducer assembly thereof. The logging tool includes a support structure 20 which comprises upper and lower panels 22 and 24, respectively, and a reduced connecting member 26 extending between the panels. The panels 22 and 24 define a transducer compartment 27 within the tool within which the acoustic transducers are mounted. The transducer compartment is provided with a peripheral window 28 which is relatively transparent to acoustic energy. The window 28 may be formed of a suitable material which desirably has an acoustic impedance close to the impedance of the well fluid 14. The transducer compartment also is filled with a suitable coupling liquid which desirably has an acoustic impedance close to that of the well fluid 14 and the window 28. By way of example, window 28 may be formed of a .05″ thick Hycar rubber sleeve and the liquid may be a light oil such as SAE 10W motor oil.

A transducer assembly 30 is mounted within compartment 27 for rotational movement about the connecting member 26. The transducer assembly includes a carriage member 31, which may be a cylindrical tube, and at least two transducer supports 34 and 35 which are secured to the carriage member. Acoustic transducers 36 and 37 are mounted on the supports 34 and 35, respectively, at longitudinally spaced positions in the compartment 27. Transducers 36 and 37 are directional electroacoustic transducers and are inclined at an angle with respect to each other in order to provide a beam focus point at a desired point laterally of the transducers. By way of example, transducers 36 and 37 may be piezoelectric crystals of lead zirconate titanate, each having a resonant frequency within the range of one to two megahertz.

The logging tool also is provided with a prime mover such as an electric motor 39. A drive mechanism indicated by broken line 40 interconnects the prime mover and the carriage member so that the transducer assembly may be rotated with respect to the support structure 20. The upper and lower sections 42 and 44 of the logging tool may be provided with suitable centralizing means (not shown) for positioning the tool concentrically within the well.

It will be recognized that the transducer assembly 30 is protected from impact injury as might occur during movement of the tool 10 through the well. The upper and lower sections 42 and 44 shield the transducer assembly from possible longitudinal contact with the obstructions in the well and the recessed location of the transducer assembly within the compartment 27 greatly reduces the possibility of lateral impact. Thus, it can be seen that the logging tool provides structural protection for the transducer assembly.

In operation of the logging system illustrated in FIGURE 1, the logging tool 10 is lowered into the well 12 and the prime mover 39 is energized to rotate the transducer assembly 30 about the connecting member 26. The transmitting transducer 36 is excited to generate pulses of acoustic energy which travel predominantly in a confined, narrow beam path toward the wall of the well 12. For example, the transducers 36 and 37 may directionally transmit and receive, respectively, acoustic signals having a predominant frequency within the range of one to two megahertz. The transducers may be rotated at 100–400 revolutions per minute and the signal pulses may be generated at a repetition frequency on the order of 2,000 times per second. The acoustic pulses reflected from the wall of the well are detected by the receiving transducer 37 and converted into representative signals such as electric pulses. These signals then are transmitted to the surface via suitable communication channels in the cable 11 where they are received by the remote circuitry 16 which functions in response to the received signals to intensity modulate the beam of the cathode ray oscilloscope 18. The logging tool 10 also is provided with position indicating means (not shown) which functions to transmit a position signal to the surface which is representative of the angular position of the transducer assembly 30 within the well. This position signal operates to horizontally sweep the oscilloscope beam across the face of the oscilloscope in proportion to the angular position of the transducer assembly 30 within the well. As the logging tool 10 is moved upwardly through the well, a depth indicating means such as a measuring sheave 46 which is rotated by the cable 11, generates a depth signal which functions to control the sweep of the oscilloscope beam vertically across the face of the oscilloscope.

From the foregoing description it will be recognized that as the logging tool is moved upwardly or downwardly through the well and the transducer assembly 30 rotated, a display is produced on the face of the oscilloscope which is correlated with the depth of the logging tool within the well. Whenever the beam of acoustic pulses generated by the transmitting transducer 36 encounters an anomaly such as a fracture in the well wall, the beam is not reflected directly back to the receiving transducer 37. When a pulse is not received by the transducer 37, the surface circuitry does not receive a representative signal to intensity modulate the beam of the oscilloscope and a gap is indicated on the face of the oscilloscope. The oscilloscope face thus presents a display of anomalies found in the wall of the well.

While the acoustic logging system has thus far been described with regard to surveying the face of the well, it will be recognized that the system may be utilized in surveying the adjacent subterranean formations. For example, the logging system may be utilized to determine the orientation of anomalise in the subterranean formations at locations spaced from the wall of the well. In utilizing the system to log the adjacent formations, it is desired to utilize transducers which directionally transmit and receive within a lower frequency range than that heretofore described. For example, the transducers 36 and 37 may transmit and receive, respectively, a directional acoustic signal having a predominant frequency within the range of 50 to 100 kilohertz. In this case, it will also be necessary to utilize a lower repetition frequency for pulse transmission and the transducers should be rotated at a lower speed. Thus, the repetition frequency may be 50 pulses per second and the transducers may be rotated at one r.p.m.

Figure 2:
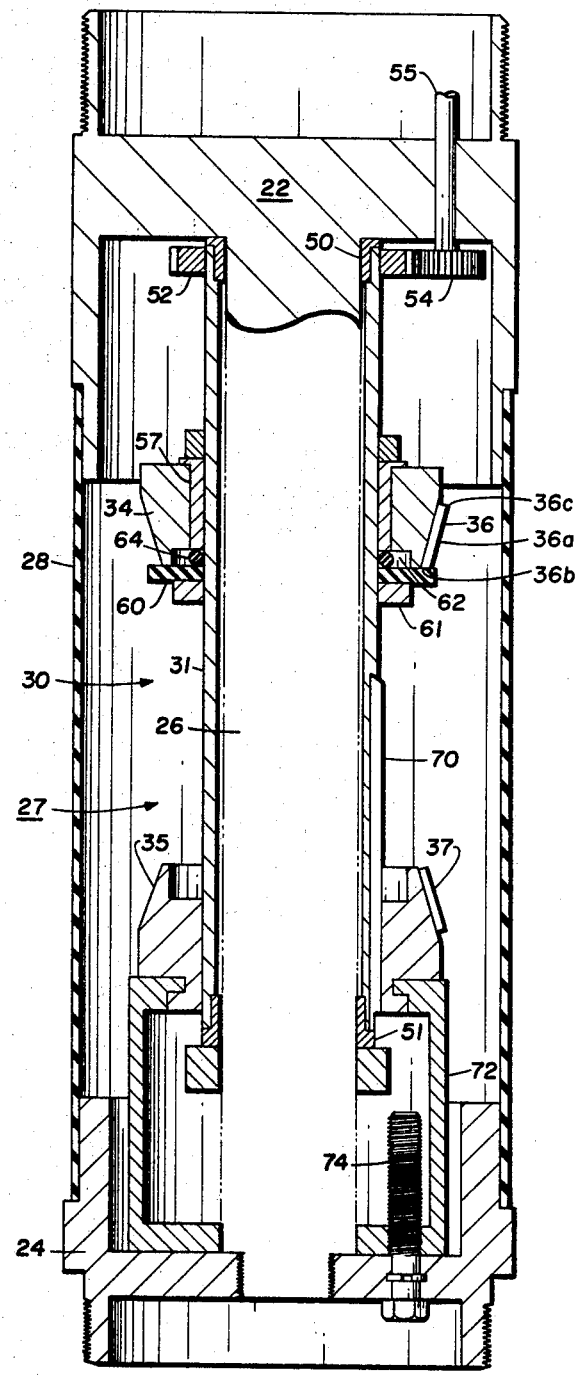
FIGURE 2 is an illustration, partly in section, showing in detail a portion of the tool of FIGURE 1.

Turning now to FIGURE 2, there is illustrated an enlarged view of the transducer compartment 27 showing in detail a preferred form of transducer assembly embodying the present invention. The cylindrical carriage member 31 is mounted on bearings 50 and 51 for rotational movement about the connecting member 26. A spur gear 52 is mounted on the carriage member 31, and engages a pinion gear 54 which is mounted on a drive shaft 55. Shaft 55 is journaled in the panel 22 and connected to the motor 39 (FIGURE 1) whereby the carriage member 31 is rotated upon energization of the motor.

In this description, the transducer 36 has been designated as the transmitting transducer and the acoustic attenuating means disclosed in detail hereinafter will be described with reference to the transmitting transducer and its associated support. However, it is to be recognized that such attenuating means may be applied to the receiver rather than the transmitter or to both the transmitter and receiver.

The transducer support 34 for the transmitting transducer 36 preferably takes the form of an annular ring which is mounted upon the carriage structure 31. Interposed between the inner surface of the support 34 and the outer surface of the carriage member is an annular liner 57 formed of a suitable acoustic attenuating material. The liner 57 acoustically isolates the support 34 from the carriage member 31 and attenuates acoustic energy which is transmitted from the transmitting transducer 36 through the support 34 to the carriage member 31. The liner 57 preferably forms a rigid base for support 34 so that the transducer 36 is not easily shifted from its desired orientation relative to the wall of the well and the transducer 37.

The transducer support 35 is similar to support 34, but is slidably mounted upon the carriage member 31 by means of an elongated key 70. Support 35 is held at a desired focal distance from the first transducer support by means of an adjustable mounting sleeve 72. A bolt 74 extends through the lower panel 24 and is threaded through the mounting sleeve 72. It will be recognized from an examination of FIGURE 2 that the transducer support 35 may be moved toward the support 34 by manual rotation of the bolt 74.

As noted previously, the transducer 36 is of the directional type and the acoustic energy generated follows predominantly a straight primary transmission path which is normal to the active face 36a of the transducer. However, some energy deviates from the primary transmission path and follows secondary transmission paths which are angularly displaced from the primary path. In order to reduce cross-feed due to the acoustic energy following the secondary paths, the transducer assembly embodying the present invention is provided with a baffle member formed of a suitable acoustic attenuating material.

More particularly and with further reference to FIGURE 2, there is shown a baffle member 60 which is interposed between the transducers 36 and 37 and positioned adjacent the transmitting transducer 36. The baffle member is secured in place by means of a collar 61. The member 60 is at least coextensive with the side 36b of the transducer 36 which is proximate with respect to the receiving transducer 37. This positioning of the baffle member relative to the transmitting transducer attenuates energy transmitted along secondary paths from the proximate side 36b of the transducer 36 and thus reduces cross-feed to the receiving transducer 37. Preferably, the baffle member will extend laterally outward of the proximate edge of the active face 36a of the transducer 36 in order to reduce cross-feed due to acoustic energy transmitted along secondary paths from the active face 36a of the transmitting transducer. However, it is desirable that the baffle member extend laterally outward no further than the remote edge 36c of the active face of the transmitting transducer in order to avoid substantial interference with the beam of acoustic energy transmitted along the primary transmission path. Thus, the baffle member 60 preferably terminates within the lateral interval defined by the remote and proximate edges of the active face of the transmitting transducer. Preferably the baffle member is in an abutting relationship with the proximate side of the first transducer in order to avoid direct contact of the side 36b with the body of oil filling the chamber 27.

The transducer support 34 is provided with a recess 62 which is formed in the inner surface of the support and at the end thereof proximate with respect to the transducer support 35. The recess preferably extends peripherally around the carriage member 31 and thus with the side of the baffle member 60 forms an annular groove.

A second liner 64, formed of a suitable acoustic attenuating material, is disposed in the recess 62 between the liner 57 and the baffle member 60 and extends peripherally around the carriage structure. The second liner 64, which may take the form of a rubber O-ring, functions to reduce the cross-feed of acoustic energy from the support member 34 along secondary transmission paths to the carriage member 31. In addition, the liner 64 provides a means for precise positioning of the support member 34 on the carriage member 31. Preferably, the depth of recess 62 is greater than the thickness of the second liner 64. By this arrangement, a void space is provided in the recess 62 which functions further to reduce cross-feed due to the acoustic energy traveling downwardly through the transducer support 34 along the aforementioned secondary transmission paths. This void space and the compartment 27 are in fluid communication such that the void space is filled with the aforementioned coupling liquid at the same pressure as in compartment 27.

Figure 3:
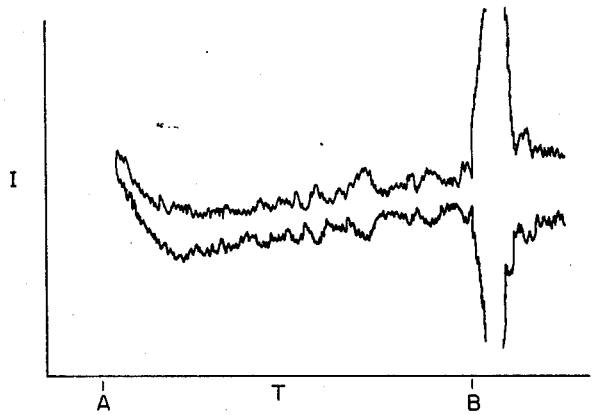
FIGURE 3 is a schematic illustration of an oscilloscope display showing the cross-feed between spaced transducers mounted in an assembly lacking acoustic attenuating means in accordance with the present invention.

Turning now to FIGURE 3, there is shown a graphic representation of the results of a test carried out on a transducer assembly employing the liner 57 but without the baffle member 60 and second liner 64. FIGURE 3 is a drawing, somewhat schematized, of an oscilloscope display of the signals generated by a receiving transducer 37 in response to received acoustic signals. FIGURE 3 is a plot of signal amplitude I on the vertical ordinate and time T on the horizontal ordinate. In FIGURE 3 as well as FIGURE 4 described hereinafter, the envelope width is representative of the signal amplitude. The transmitting transducer was fired at approximately time A and the reflected survey signal was received by the receiving transducer at approximately time B. Although the maximum amplitude of the survey signal is not shown, from an inspection of FIGURE 3 it can be seen that a relatively high cross-feed is introduced shortly after the transmitting transducer is triggered. While this high burst of initial cross-feed may be tolerated in some circumstances, it may tend to obscure the survey signal, particularly when logging in relatively small wells having diameters on the order of six inches or less. In such wells the arrival time of the survey signal will tend to coincide with or follow closely the relatively high amplitude cross-feed.

Figure 4:
FIGURE 4 is a schematic illustration of an oscilloscope display showing the cross-feed present in an assembly formed in accordance with the present invention.

Turning now to FIGURE 4, there is illustrated a representation of an oscilloscope display obtained utilizing the second liner and baffle of the present invention. As can be seen from an examination of FIGURE 4, the initial high energy burst of cross-feed introduced shortly after time A has been greatly reduced.

The liners 57 and 64 and the baffle member 60 preferably are formed of acoustic attenuating materials of much lower acoustic impedances than the structurally rigid materials forming the transducer supports and carriage member 31. In addition, the materials should be mechanically stable in the environment of oil at the high pressures and temperatures commonly encountered in wells. By way of example, the liner 57 may be formed of Teflon which exhibits the desired properties and is easily machined to the desired configuration. The baffle member 60 and liner 64 may be formed of neoprene and/or Hycar rubber. The transducer supports may be formed of strong structural materials such as steel or aluminum. Materials other than those noted above may be used. However, it is preferred to form the baffle member 60 of a material such as neoprene which is impermeable to oil. This will ensure that oil does not permeate the baffle member and establish direct contact with the edge 36b of the transmitting transducer 36.

What is claimed is:

1. In an acoustic well logging tool adapted to be moved longitudinally through a well, the combination comprising:
   a carriage member in said tool;
   first and second transducer supports secured to said carriage member at longitudinally spaced positions;
   first and second acoustic transducers mounted, respectively, on said first and second supports, said first transducer having an outer active face inclined in the direction of said second transducer whereby the edge of said active face which is remote with respect to said second transducer is laterally outward of the edge of said active face which is proximate with respect to said second transducer;
   a baffle member formed of acoustic attenuating material positioned adjacent said first transducer and between said first and second transducers, said baffle member being at least coextensive with the proximate side of said first transducer and extending laterally outward of the proximate edge of the active face of said first transducer and terminating within the lateral interval defined by the remote and proximate edges of the active face of said first transducer; and
   a liner formed of acoustic attenuating material interposed between the inner surface of said first transducer support and said carriage member.

2. In an acoustic well logging tool adapted to be moved longitudinally through a well, the combination comprising:
   a carriage member in said tool;

first and second transducer supports secured to said carriage member at longitudinally spaced positions, said first transducer support extending around the periphery of said carriage member;

first and second acoustic transducers mounted, respectively, on said first and second supports, said first transducer having an outer active face inclined in the direction of said second transducer whereby the edge of said active face which is remote with respect to said second transducer is laterally outward of the edge of said active face which is proximate with respect to said second transducer;

a baffle member formed of acoustic attenuating material supported on said carriage member and extending around the periphery thereof positioned adjacent said first transducer and between said first and second transducers, said baffle member extending laterally outward from the surface of said carriage member and being at least coextensive with the proximate side of said first transducer and in an abutting relationship with the proximate side of said first transducer;

a first liner formed of acoustic attenuating material extending around the periphery of said carriage member and interposed between the inner surface of said first transducer support and said carriage member;

a recess formed in the inner surface and the proximate end of said first support and extending peripherally around said carriage member; and a second liner of acoustic attenuating material disposed in said recess between said first liner and said baffle member and extending peripherally around said carriage member.

3. In an acoustic well logging tool adapted to be moved longitudinally through a well, the combination comprising:

a support structure in said tool including longitudinally spaced panels and a reduced connecting member extending between said panels, said panels defining a transducer compartment in said tool;

a carriage member mounted in said transducer compartment for rotation about said connecting member;

first and second transducer supports secured to said carriage member at longitudinally spaced positions;

first and second acoustic transducers mounted, respectively, on said first and second supports, said first transducer having an outer active face inclined in the direction of said second transducer whereby the edge of said active face which is remote with respect to said second transducer is laterally outward of the edge of said active face which is proximate with respect to said second transducer;

a baffle member formed of acoustic attenuating material positioned in an abutting relationship with the proximate side of said first transducer, said baffle member being at least coextensive with the proximate side of said first transducer and terminating within the lateral interval defined by the remote and proximate edges of the active face of said first transducer; and a liner formed of acoustic attenuating material interposed between the inner surface of said first transducer support and said carriage member.

4. The combination of claim 3, wherein said first transducer support, said liner, and said baffle member extend around the periphery of said carriage member, said baffle member being supported on said carriage member and extending laterally outward from the surface of said carriage member, a recess formed in the inner surface and the proximate end of said first support and extending peripherally around said carriage member, and a second liner formed of an acoustic attenuating material disposed in said recess between said first named liner and said baffle member and extending peripherally around said carriage member.

5. The combination of claim 4 wherein the depth of said recess is greater than the thickness of said second liner whereby a void space is provided in said recess, and said transducer compartment and said void space being filled with liquid and in fluid communication with one another.

6. The combination of claim 5 wherein said baffle member is formed of an acoustic attenuating material which is impermeable to said liquid.

References Cited

UNITED STATES PATENTS 3,102,604   9/1963   Engle _____ 181—.59

SAMUEL FEINBERG, *Primary Examiner.*